L. J. COOPER.
AUXILIARY SPARK LEVER CONTROL.
APPLICATION FILED JAN. 14, 1919.
1,349,944.
Patented Aug. 17, 1920.
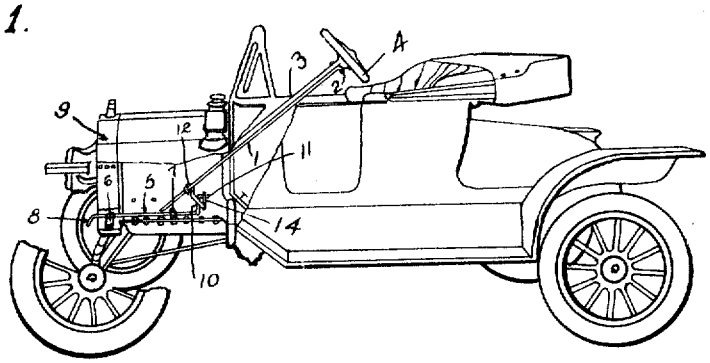
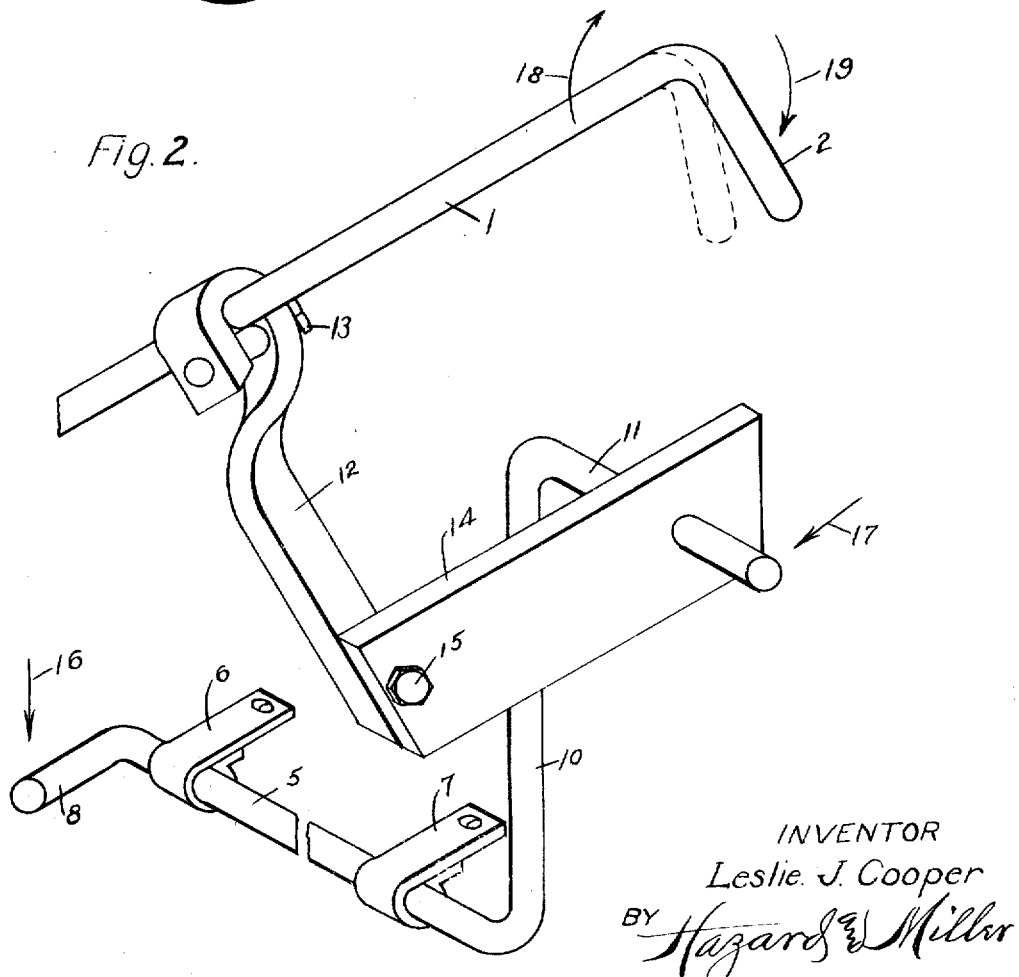
INVENTOR
Leslie J. Cooper
BY Hazard & Miller
ATTORNEYS

UNITED STATES PATENT OFFICE.

LESLIE J. COOPER, OF LOS ANGELES, CALIFORNIA.

AUXILIARY-SPARK-LEVER CONTROL.

1,349,944.  Specification of Letters Patent.  Patented Aug. 17, 1920.

Application filed January 14, 1919. Serial No. 271,099.

*To all whom it may concern:*

Be it known that I, LESLIE J. COOPER, a citizen of the United States, residing at Los Angeles, in the county of Los Angeles and State of California, have invented new and useful Improvements in Auxiliary-Spark-Lever Control, of which the following is a specification.

My object is to make an auxiliary spark adjuster so that in cranking an engine the spark may be adjusted from the cranking position in front of the engine and my invention consists of the novel features herein shown, described and claimed.

Figure 1 is a side elevation of an automobile provided with an auxiliary spark adjuster in accordance with the principles of my invention, parts of the automobile being broken away to show the invention.

Fig. 2 is a perspective showing the details of the auxiliary spark adjuster.

Referring to the drawing in detail, the ignition control rod 1 has a crank 2 at its upper end and these parts are of ordinary construction, the rod 1 being arranged along the side of the steering post 3 and the crank 2 being under the steering wheel 4.

The auxiliary shaft 5 is mounted alongside of the engine there being bracket bearings 6 and 7 adapted for attachment to the frame of the engine and the shaft 5 rotating in the bearings. A crank handle 8 extends from the forward end of the shaft 5 to a point in front of the radiator 9. An arm 10 is bent from the rear end of the shaft 5 at right angles and a crank pin 11 is bent at right angles from the upper end of the arm 10. An arm 12 is clamped upon the rod 1 by a bolt 13. A link 14 is connected to the free end of the arm 12 by a bolt 15 and the crank pin 11 extends through an opening in the other end of the link. On account of the different angularities of the parts the crank pin 11 should fit loosely in the link 14 and the joint formed by the bolt 15 should be loose.

Supposing that the crank handle 2 is in the normal position to retard the spark as is usual in cranking an engine and in a position shown in the full lines in Fig. 2, then as soon as the engine has been cranked it is desired to advance the spark and the crank handle 8 will be moved in the direction indicated by the arrow 16 thereby swinging the crank pin 11 in the direction indicated by the arrow 17 thereby rotating the rod 1 in the direction indicated by the arrow 18 and swinging the crank handle in the direction indicated by the arrow 19 and as indicated by the dotted lines. In this way the operator cranking the engine may adjust the spark from the position he occupies in front of the engine and without running around to the steering wheel as has been the practice heretofore.

Various changes may be made without departing from the spirit of my invention as claimed.

I claim—

1. A spark adjusting mechanism for motor vehicles comprising in combination with the motor, and a main spark adjusting rod connected with said motor, of an auxiliary spark adjusting member having one of its ends extended in front of the vehicle and arranged for manual operation and a portion operably connected with said main spark adjusting rod, the extended end of said auxiliary member being spaced and detached from the starting crank and adapted to operate said main spark rod, whereby the spark may be advanced or retarded apart from said main rod.

2. A spark adjuster for a motor vehicle comprising a spark control rod; a shaft rotatably mounted; a crank handle extending from the forward end of the shaft in front of the radiator of the vehicle; an arm extending from the rear end of the shaft; a crank pin extending from the free end of the arm; a second arm attached to the spark control rod; and a link connecting the crank pin to the free end of said second arm.

In testimony whereof I have signed my name to this specification.

LESLIE J. COOPER.